United States Patent

Brömssen et al.

[11] Patent Number: 6,151,109
[45] Date of Patent: Nov. 21, 2000

[54] DEVICE FOR DETECTING AND CALCULATING THE FOCUS POINT POSITION, SHAPE AND POWER DISTRIBUTION OF A LASER BEAM

[75] Inventors: Bernt von Brömssen, Göteborg; Thomas Nilsson, Mölndal, both of Sweden

[73] Assignee: Institutet For Verkstadsteknisk Forskning, Molndal, Sweden

[21] Appl. No.: 09/423,416

[22] PCT Filed: May 6, 1998

[86] PCT No.: PCT/SE98/00838

§ 371 Date: Nov. 4, 1999

§ 102(e) Date: Nov. 4, 1999

[87] PCT Pub. No.: WO98/50196

PCT Pub. Date: Nov. 12, 1998

[30] Foreign Application Priority Data

May 7, 1997 [SE] Sweden ................................. 9701710

[51] Int. Cl.[7] ...................................................... G01J 1/00
[52] U.S. Cl. .......................... 356/121; 356/123; 356/375; 250/201.2; 219/121.83
[58] Field of Search ..................................... 356/121, 123, 356/125, 375, 384; 250/201.2, 201.4; 331/66; 396/89; 219/121.83, 121.73, 121.78

[56] References Cited

U.S. PATENT DOCUMENTS

| 3,555,280 | 1/1971 | Richards | 250/201.7 |
| 3,571,598 | 3/1971 | Lombard | 356/123 |
| 4,008,965 | 2/1977 | Nobusawa | 356/125 |
| 4,009,392 | 2/1977 | Hanley | 356/123 |
| 4,472,055 | 9/1984 | Tsutsumi | 356/375 |
| 4,772,772 | 9/1988 | Jüptner et al. | 219/121.83 |

FOREIGN PATENT DOCUMENTS

| 0437226 | 7/1991 | European Pat. Off. . |
| 0440990 | 8/1991 | European Pat. Off. . |
| 2300534 | 11/1996 | United Kingdom . |

*Primary Examiner*—Hoa Q. Pham
*Attorney, Agent, or Firm*—Samuels, Gauthier & Stevens, LLP

[57] ABSTRACT

Device for detecting and calculating focus point position (2), shape (3) and power distribution of a laser beam after a focussing lens, and which at least incorporates a laser source (10), the focussing lens (4), a light affecting body (5, 6), a light sensor (7), and means for calculation (9). The device is characterized in that the focussing lens (4), the light affecting body (5, 6) and the light sensor (7) are arranged so that their relative distance is changeable, that the laser beam (1) and the light affecting body (5, 6) are arranged to perform a relative movement consisting of one or more tracing movements through the beam path, preferably in at least one plane and with different relative distances, that the light sensor (7) is arranged to measure at least a fraction of the laser light (1) emitted by the light affecting body (5, 6), and that the light sensor (7) is arranged to produce an output signal (8) which is arranged to be received by a calculating means (9) for calculation of focus point position (2), shape (3) and power distribution.

5 Claims, 1 Drawing Sheet

DEVICE FOR DETECTING AND CALCULATING THE FOCUS POINT POSITION, SHAPE AND POWER DISTRIBUTION OF A LASER BEAM

TECHNICAL FIELD

The invention relates to a device for detecting and calculating focus point position, shape and power distribution of a laser beam after a focussing lens, and which at least incorporates a laser source, the focussing lens, a light affecting body, a light sensor, and means for calculation.

BACKGROUND OF THE INVENTION

As automation increases in industry and increased complexity when choosing materials lasers become increasingly important. Especially promising is the Nd:YAG laser, which is very well suited to be integrated with a robot, but also carbon dioxide and excimer lasers are important for industry. There are also other lasers, which industrial applicability is high.

In this kind of inventions, there is often a lens having the purpose of focussing the laser beam in desired way. A consequence of the presence of the lens is that the laser beam appears with a waist, i.e. a shape which in the direction of the beam first presents a narrowing feature, which thereafter becomes wider. The processing effect of the laser beam is naturally at maximum where the beam presents its smallest surface. Therefore, it is interesting to be able to position the laser simply and effectively in order to accomplish this.

Today, one way of measuring the position of the focus point position, which should be the same as the tool center point of the robot, is based on the assistance of a visual assisting laser and manually moving the robot in order to position the focus point position in a well-defined position in space. This is normally time-consuming and gives an obvious lack of precision.

In SE-447 972 a method for detecting a focus point position for a device processing with a laser is presented. It is characterized by a light shielding element, which can shield a fraction of the laser beams and a light sensor, produces an output signal. The output signal is proportional to the amount of laser light having passed through the light shielding element. The searching for focus is arranged so that at least the light shielding element or the light sensor is moved in direction of the optical axis for detection of the position, at which the output signal of the light sensor is at its maximum or at its minimum. Based on the minimum or maximum output signal of the light sensor the focus point position is detected. It should be noted that the invention described in this document only detects the focus point position and does not deal with the shape or power distribution of the laser beam.

PURPOSE OF THE INVENTION AND ITS MOST CHARACTERISING FEATURES

An area within which the present invention can be used is processing of various materials (e.g. metals and plastics) such as welding, cutting, soldering and hardening with a laser. In these cases a high power laser is used. It should be noted that the invention preferably also can be used in connection with low power lasers, for instance when positioning of robots intended for automatized spray painting. In this case a previously known low power laser and a focussing lens are arranged to the robot, or robots at machines with multiple axes, so that the focus point position of the laser always coincides with the tool center point, also known as TCP, if this has been chosen in a free point in the vicinity of the machine. Thus, the present invention can here be used to determine the tool center point of a robot or another machine, even if the tool is of another kind than a laser.

The present invention is constituted by that a focussing lens, the light affecting body and the light sensor are arranged so that their relative distances are adjustable, that the laser beam and the light affecting body are arranged to perform a relative movement consisting of one or more tracing movements through the beam path, preferably in at least one plane and with different relative distances, that the light sensor is arranged to measure at least a fraction of the laser light emitted by the light affecting body, and that the light sensor is arranged to produce an output signal which is arranged to be received by a calculating means for calculation of focus point position, shape and power distribution.

DESCRIPTION OF THE DRAWINGS

The invention will be described below with reference to the appended drawings showing the preferred embodiment.

DESCRIPTION OF THE PREFERRED EMBODIMENT

Figure 1:
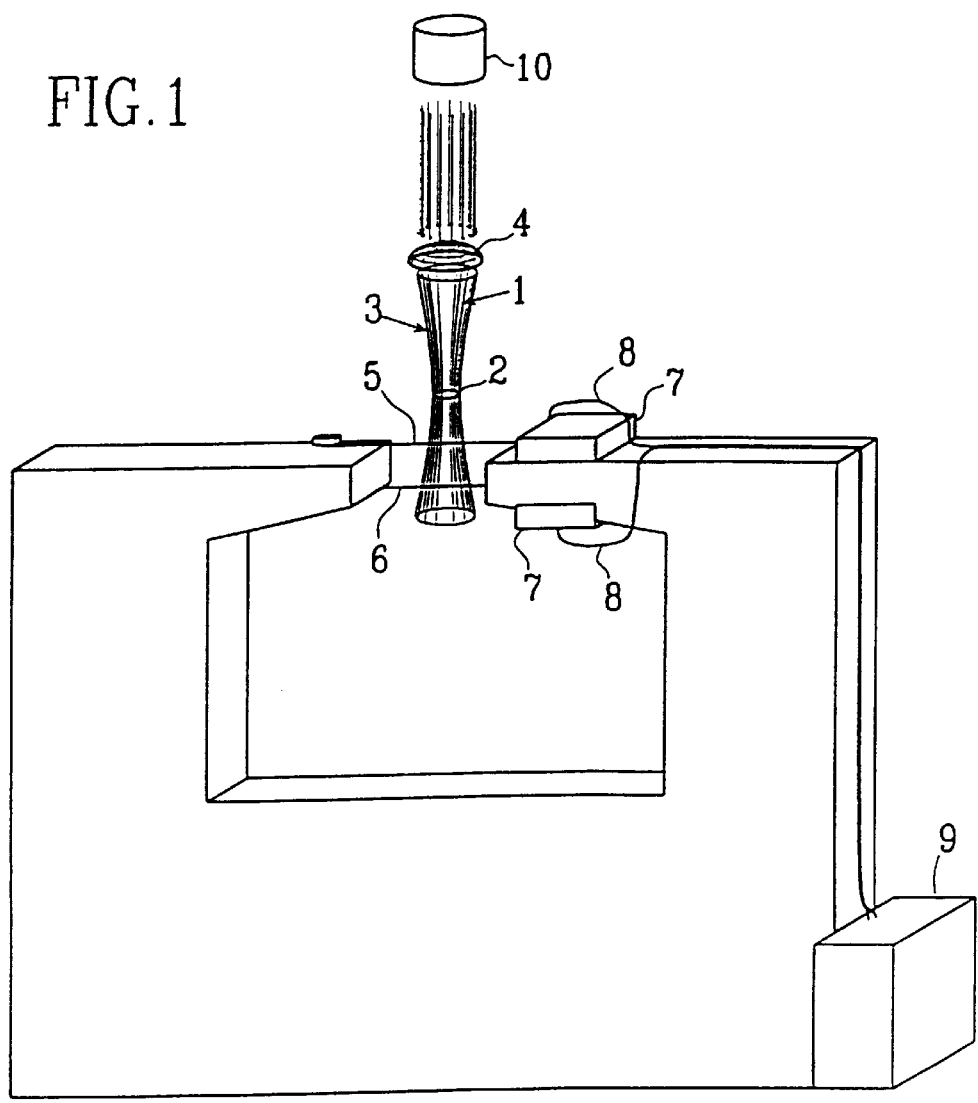
FIG. 1 shows an embodiment of how the present invention can be implemented.
Figure 2:
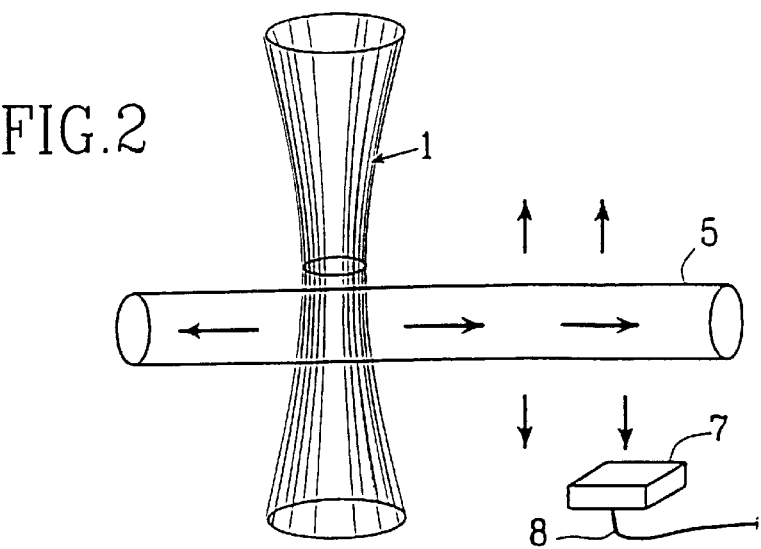
FIG. 2 shows schematically an embodiment of a transmitting light affecting body, which in this case is constituted by an optical fiber, which is illuminated by a laser beam.

FIG. 1 shows an embodiment of the present invention. This example is intended to be used in connection to the working area, i.e. where, e.g. the cutting with a high power laser can take place. It is possible to put the embodiment besides a working area or at different places in the working area, in order to detect and calculate the focus point position 2, shape 3 and power distribution of the laser beam 1 when necessary after a focussing lens 4, at different locations in the working area. Uniform quality can then be obtained in the whole working area. In FIG. 2, an optical fiber 5, a sensor 7 and a laser beam 1 are presented. The laser beam 1 is arranged onto the optical fiber 5. In FIG. 1, two optical fibers 5, 6 are presented, which fibers are parallel, but this is not an absolute condition in order to achieve the purpose of the invention. However, there is a distance between them, if you relate to the direction of the laser beam 1. Important in this embodiment is that the laser beam 1 is transmitted through them. When the laser beam 1 is transmitted, also a certain diversion of the beam along the longitudinal axis of the optical fiber takes place. A fraction of this diversified radiation exits the optical fiber radially to be detected by a sensor 7, which can be previously known. Another possibility is to arrange a number of light sensors with different light sensitivity which together generate a measure of the power of the beam with scales. The output signal of the sensor 8 is connected to a means for calculation 9, which object is to calculate the focus point position 2, shape 3 and power distribution of the laser beam 1. It should be noted that the laser beam is generated by a laser source 10 which is suitable for the task. One of the calculations is based on basic formulae describing the shape of a laser beam $d(z)$, after it has passed through a focussing lens 4;

$$d(z) = d_0 \sqrt{1 + (z/z_0)^2},$$

where $d_0$ is the width of the beam in the focus point position, $z_0$ is a constant describing the optical device and $z$ is the distance from the focus point position in direction of the beam. In a simple case when a beam traces perpendicularly to a fiber, the formula above is sufficient. Then you have to do at least two traces with the laser beam. In other cases the problem can be solved by introducing an angle parameter in the equation, which then appears more complicated. In the latter case when the beam is inclined and thus deviates from the traditional z-direction, an extra trace is necessary in order to find the focus point position. Generally, it can be said that an increased number of fibers, or more generally light affecting bodies, lead to the need of a lower number of traces of the laser beam over the fibers/bodies.

In the preferred embodiment in FIG. 1, there are two optical fibers 5, 6 and two sensors 7, which in this case are identical. They do not necessarily have to be identical. Both sensors 7 are connected to the means for calculation 9, which based on the output signals 8 of the sensor 7, calculates the focus point position 2, shape 3 and power distribution of the laser beam 1. The laser beam 1 is arranged to trace over the optical fibers 5, 6 at a certain distance. The shape 2 of the beam 1 is calculated from the radiation, which one or more light sensors 7 detect at the traces. If the power of laser beam 1 is homogenous in its cross section a Gause-like distribution can be detected. If further traces are necessary the distance between the fibers 5, 6 and the focussing lens 4 are changed and the laser beam 1 traces over the fibers 5, 6 once again. Based on the information which can be detected from the traces, the focus point position 2, shape 3 and power distribution of the laser beam 1 can be determined.

When the focus point position 2, shape 3 and power distribution of the laser beam 1 has been determined by the means for calculation 9, this information is used to control the processing tool, which e.g. can be equipment for welding, cutting, soldering and hardening or a spraying nozzle. Also, the device can be applied in other processes, where it is important to know the tool center point. It is also conceivable that the produced information is used as information to the user.

It should be noted that previously known filters may be necessary in order to filter the output signals 8 from the sensors 7 in order to increase the precision in the result from the invention. These may be placed e.g. in the vicinity of the means for calculation 9.

Also, it should be noted that the light affecting body, which is mentioned in the appended patent claims, does not have to be one or several optical fibers, but also other transmitting suitable bodies are sufficient to achieve the purpose of the invention.

An alternative to a transmitting body is a reflecting body, which also can be used in the invention to achieve the purpose. In such a case, the sensor is placed in such a manner that it absorbs directly reflected radiation from the body. An example of such a body is one which to a large extent consists of silver. Such a body can be of arbitrary, known geometry. For instance a limited area of the surface of the light affecting body 5, 6 can processed so that the direction of the reflected radiation from the limited area clearly deviates from the direction of the rest of the radiation. Thereby the intensity of the beam in a point can be determined by one or several suitably placed sensors 7.

Another alternative to a transmitting or reflecting body is an absorbing body. These can only be used with low power lasers.

The power distribution of the laser beam 1 can be disturbed if the so called shielding glass, which is located after the focussing lens 4 in the direction of the laser beam 1, is dirty. Then it is possible that one or several sensors detect the change based on calibration data and provide a signal to a user that the shielding glass should be checked.

Also, it could be important to note that the device according to the invention must before the first time of use be calibrated from e.g. chosen type of light affecting body, location of one or more sensors, laser type and focussing lens.

It should be noted that the term light affecting body also comprises fluids enclosed in a suitable casing.

What is claimed is:

1. A device for detecting and calculating focus point position, shape and power distribution of a laser beam after a focussing lens, and which at least incorporates a laser source, the focussing lens, a light affecting body, a light sensor, and means for calculation, wherein the focussing lens, the light affecting body and the light sensor are arranged so that their relative distance are changeable, the laser beam and the light affecting body are arranged to perform a relative movement consisting of one or more tracing movements through the beam path in at least one plane and with different relative distances, the light sensor is arranged to measure at least a fraction of the laser light emitted by the light affecting body, and the light sensor is arranged to produce an output signal which is arranged to be received by a calculating means for calculation of focus point position, shape and power distribution.

2. The device according to claim 1, wherein the light affecting body consists of a transmitting and/or a reflecting body.

3. The device according to claim 2, wherein the light affecting body is an optical fiber.

4. The device according to claim 2, wherein light affecting body to a considerable extent is constituted by silver.

5. The device according to claim 1, wherein the light affecting body consists of an absorbing body when the laser source is a laser of low power.

* * * * *